(12) United States Patent
Mao

(10) Patent No.: US 10,862,402 B2
(45) Date of Patent: Dec. 8, 2020

(54) SYSTEM AND METHOD FOR POWER CONVERTER INCLUDING INVERTER, RESONANT CIRCUIT, AND VOLTAGE MULTIPLIER

(71) Applicant: GENERAL ELECTRIC COMPANY, Schenectady, NY (US)

(72) Inventor: Saijun Mao, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/238,237

(22) Filed: Jan. 2, 2019

(65) Prior Publication Data

US 2019/0245426 A1 Aug. 8, 2019

(30) Foreign Application Priority Data

Jan. 2, 2018 (CN) .......................... 2018 1 0002027

(51) Int. Cl.
*H02M 7/10* (2006.01)
*H02M 3/335* (2006.01)
(Continued)

(52) U.S. Cl.
CPC ......... *H02M 7/10* (2013.01); *H02M 3/33569* (2013.01); *H02M 3/33592* (2013.01);
(Continued)

(58) Field of Classification Search
CPC ............ H02M 7/19; H02M 7/10; H02M 7/25; H02M 7/48; H02M 7/4826;
(Continued)

(56) References Cited

U.S. PATENT DOCUMENTS 7,477,529 B2  1/2009  Salama et al.
9,458,813 B2  10/2016 Sekiguchi
(Continued)

FOREIGN PATENT DOCUMENTS

CN    102013695 A    4/2011
CN    203326656 U   12/2013
(Continued)

OTHER PUBLICATIONS

Sasan Zabihi, Firuz Zare, Gerard Ledwich, Arindam Ghosh, Zeynab Zabihi; "A novel CDVM based high-voltage converter using low power solid-state switches and a tuned resonant circuit designed for pulsed power applications"; Apr. 23, 2012; IEEE; pp. 454-460 (Year: 2012).*

(Continued)

*Primary Examiner* — Thienvu V Tran
*Assistant Examiner* — Shahzeb K Ahmad
(74) *Attorney, Agent, or Firm* — Meagher Emanuel Laks Goldberg & Liao, LLP

(57) ABSTRACT

According to various embodiments, a system and method for a power converter including an inverter and a first voltage multiplier is disclosed. The inverter is configured to convert a first DC voltage into a first AC voltage. The first voltage multiplier is coupled to an output of the inverter and configured to convert the first AC voltage into a second DC voltage higher than a peak value of the first AC voltage. The first voltage multiplier includes a plurality of stages, each stage including two diodes, and each diode in a first stage of the plurality of stages including at least one of a silicon carbide diode and a gallium nitride diode.

20 Claims, 5 Drawing Sheets

(51) Int. Cl.
*H02M 1/00* (2006.01)
*H02M 7/48* (2007.01)

(52) U.S. Cl.
CPC .... *H02M 7/103* (2013.01); *H02M 2001/0054* (2013.01); *H02M 2001/0067* (2013.01); *H02M 2007/4815* (2013.01)

(58) Field of Classification Search
CPC ......... H02M 2007/4815; H02M 7/103; H02M 3/33592; H02M 3/33569; H02M 2001/0067; H02M 2001/0054; Y02B 70/10
See application file for complete search history.

(56) References Cited

U.S. PATENT DOCUMENTS

| | | | |
|---|---|---|---|
| 2007/0008745 A1* | 1/2007 | Joshi | H02M 3/1588 363/21.01 |
| 2012/0299477 A1 | 11/2012 | Kambara | |
| 2013/0242627 A1* | 9/2013 | Bedell | H02M 7/106 363/61 |
| 2015/0357912 A1* | 12/2015 | Perreault | H02M 1/4208 363/126 |
| 2016/0262250 A1* | 9/2016 | Mao | H05G 1/12 |
| 2018/0205238 A1* | 7/2018 | Uno | H02J 7/02 |
| 2019/0229616 A1* | 7/2019 | Illiano | H02M 3/073 |

FOREIGN PATENT DOCUMENTS

| | | |
|---|---|---|
| CN | 204316199 U | 5/2015 |
| CN | 105978323 A | 9/2016 |
| JP | 2013183557 A | 9/2013 |
| WO | 2015097994 A1 | 7/2015 |

OTHER PUBLICATIONS

Kia Filsoof, "A transformerless modular step-up dc-dc converter for high power applications",IET Power Electronics, 2014.

Aparna Das, "Implementation of transformerless step-up converter and H6 inverter for single phase AC applications", Biennial International Conference on Power and Energy Systems: Towards Sustainable Energy (PESTSE), 2016.

First Office Action issued in connection with corresponding CN Application No. 2018100020272, dated Jun. 19, 2020.

* cited by examiner

SYSTEM AND METHOD FOR POWER CONVERTER INCLUDING INVERTER, RESONANT CIRCUIT, AND VOLTAGE MULTIPLIER

TECHNICAL FIELD

Embodiments of the present invention relate to a power converter and a power converting method.

BACKGROUND

Power converters have a wide range of applications in power conversion circuits for electric or hybrid vehicles. Existing power converters typically comprise one or more transformers, resulting in existing power converters having a larger volume and lower power density.

In addition, as the switching frequency increases, the power loss of the switch also gradually becomes a problem that cannot be ignored. Larger switching power losses also pose challenges to the thermal issues of the circuit.

Therefore, it is necessary to provide a new power converter and power converting method to solve at least one of the above problems.

SUMMARY

A power converter comprising an inverter and a first voltage multiplier. The inverter is configured to convert a first DC voltage into a first AC voltage. The first voltage multiplier is coupled with an output of the inverter and configured to convert the first AC voltage into a second DC voltage higher than a peak value of the first AC voltage. The first voltage multiplier comprises a plurality of stages, each stage comprising two diodes, and each diode in a first stage of the plurality of stages comprises at least one of a silicon carbide diode and a gallium nitride diode.

A power converting method, comprising: Converting a first DC voltage into a first AC voltage; and converting the first AC voltage into a second DC voltage higher than a peak value of the first AC voltage by a first voltage multiplier. Wherein the first voltage multiplier comprises a plurality of stages, wherein the first voltage step is closer to the input of the first voltage multiplier than the other voltage steps in terms of energy transmission, each stage comprising two diodes, and each diode in a first stage of the plurality of stages comprises at least one of a silicon carbide diode and a gallium nitride diode.

BRIEF DESCRIPTION OF DRAWINGS

These and other features, aspects and advantages of the present invention will become better understood when the following detailed description is read with reference to the accompanying drawings, in which like reference numerals are used throughout the drawings to refer to like parts, where.

DETAILED DESCRIPTION OF EMBODIMENTS

The embodiments of the present invention will be described below in detail with reference to the accompanying drawings in order to facilitate those skilled in the art to exactly understand the subject matter claimed by the present invention. In the following detailed description of these specific embodiments, the present specification does not describe in detail any of the known functions or configurations, to avoid unnecessary details that may affect the disclosure of the present invention.

Unless otherwise defined, the technical and scientific terms used in the claims and the specification are as they are usually understood by those skilled in the art to which the present invention pertains. "First", "second" and similar words used in the specification and the claims do not denote any order, quantity or importance, but are merely intended to distinguish between different constituents. The terms "one", "a" and similar words are not meant to be limiting, but rather denote the presence of at least one. "Comprising", "consisting of" and similar words mean that the elements or articles appearing before "comprising" or "consisting of" include the elements or articles and their equivalent elements appearing behind "comprising" or "consisting of", not excluding any other elements or articles. "Connected", "coupled" and similar words are not restricted to physical or mechanical connections, hut may also include electrical connections, whether direct or indirect.

Embodiments of the present invention relate to a power converter that can be widely applied to a power conversion circuit of an electric vehicle for converting a lower direct voltage into a higher direct voltage.

Figure 1:
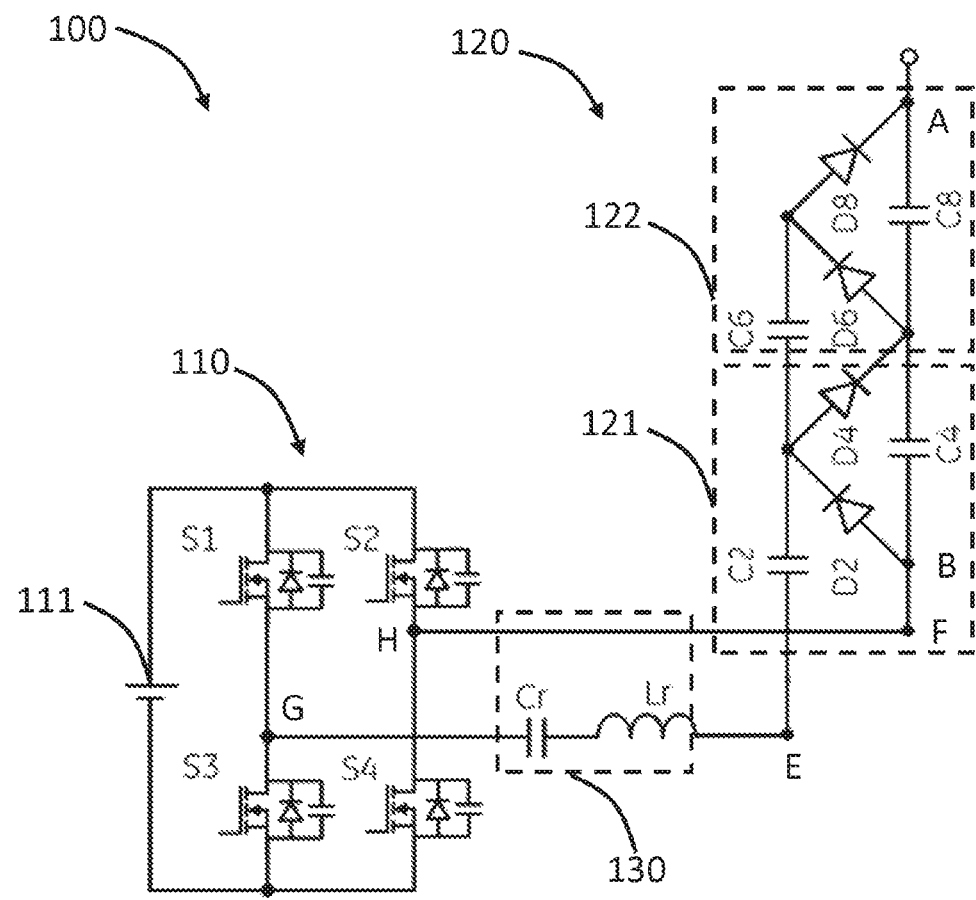
FIG. 1 is a schematic diagram of a power converter according to an embodiment of the present invention.

FIG. 1 is a schematic diagram of a power converter 100 according to an embodiment of the present invention. Referring to FIG. 1, the power converter 100 comprises an inverter 110, a first voltage multiplier 120, and a resonant circuit 130; wherein the resonant circuit 130 is coupled between the inverter 110 and the first voltage multiplier 120.

An inverter 110 is coupled across the DC voltage source 111 for converting a first DC voltage from the DC voltage source 111 to a first AC voltage. In the embodiment shown in FIG. 1, the inverter 110 comprises a first leg of a bridge and a second leg of a bridge connected in parallel with each other; the first leg of the bridge comprises a first switching device S1 and a third switching device S3 connected in series with each other, the second leg of the bridge comprises a second switching device S2 and a fourth switching device S4 connected in series with each other. The inverter 110 outputs a first AC voltage from a node G between the first switching device S1 and the third switching device S3, and a node H between the second switching device S2 and the fourth switching device S4; that is, nodes G, H are the outputs of the inverter 110.

A resonant circuit 130 is coupled to the outputs G, H of the inverter 110, and comprises a resonant capacitor Cr and a resonant inductor Lr that are connected in series with each other. The resonant circuit 130 is configured to perform frequency selective process on the first AC voltage output by the inverter 110 to output the processed first AC voltage to the first voltage multiplier 120. Specifically, the resonant circuit 130 is configured to pass a signal component in the first AC voltage within a preset frequency range, suppressing a signal component in the first AC voltage that is outside the preset frequency range, thereby reducing the harmonic component in the first AC voltage, resulting in the first AC voltage received by the voltage multiplier 120 to have a better waveform quality. In addition, the resonant capacitor Cr can also act as electrical isolation between the inverter 110 and the voltage multiplier 120.

The first voltage multiplier 120 is coupled to the output of the resonant circuit 130 and is configured to convert the first AC voltage into a second DC voltage, wherein the voltage value of the second DC voltage is greater than a peak value of the first AC voltage.

Compared with existing power converters, the power converter disclosed in the present invention eliminates the transformer, providing isolation and voltage boost through the resonant circuit and the voltage multiplier, such that the volume and weight of the power converter can be greatly reduced while increasing the power density of the power converter.

Further referring to FIG. 1, the first voltage multiplier 120 comprises a plurality of stages, each stage comprising two diodes, wherein the first voltage step is closer to the input of the first voltage multiplier than the other voltage steps in terms of energy transmission, that is, the first voltage step is coupled between the input of the first voltage multiplier and the other voltage steps of the first voltage multiplier; the energy from the resonant circuit 130 is first passed through the first voltage step after being input from the input of the first voltage multiplier, and then passes through other voltage steps.

In the embodiment shown in FIG. 1, the first voltage multiplier 120 comprises a first voltage step 121 and a second voltage step 122, wherein the first voltage step 121 is closer to the input terminals E, F of the first voltage multiplier 120 compared to the second voltage step 122, the first voltage step 121 is coupled between the input terminals E, and the second voltage step 122. The first voltage step 121 comprises a first capacitor C2, a second capacitor C4, a first diode D2, and a second diode D4. A first terminal of the first capacitor C2 is coupled to a first input terminal E of the first voltage multiplier, and a first terminal of the second capacitor C4 is coupled to a second input terminal F of the first voltage multiplier. The anode of the first capacitor D2 is coupled to the first terminal of the second capacitor C4, that is, the second input terminal F, and the cathode of the first diode D2 is coupled to the second terminal of the first capacitor C2. The anode of the second diode D4 is coupled to the second terminal of the first capacitor C2, that is, the cathode of the first diode D2, and the cathode of the second diode D4 is coupled to the second terminal of the second capacitor C4.

The second voltages step 122 comprises a first capacitor C6, a second capacitor C8, a first diode D6, and a second diode D8; the first terminal of the first capacitor C6 is coupled to the first capacitor of the first voltage step, the second terminal of the second capacitor C8 and the anode of the first diode D6 are coupled to the second terminal of the second capacitor C4 of the first voltage multiplier. The cathode of the first diode D6 is coupled to the second terminal of the first capacitor C6. The anode of the second diode D8 is coupled to the second terminal of the first capacitor C6, that is, the cathode of the first diode D6; and the cathode of the second diode D8 is coupled to the second terminal of the second capacitor C8.

The reverse recovery effect of the diode is the main cause of power loss, and the silicon carbide diode or gallium nitride diode does not cause a reverse recovery effect in the circuit, therefore the use of a silicon carbide diode or a gallium nitride diode in the voltage multiplier can reduce power loss in the voltage multiplier. Thus, in some embodiments, the diodes in each voltage step of the voltage multiplier employ silicon carbide or gallium nitride diodes to reduce power loss in the voltage multiplier.

However, a silicon carbide diode or a gallium nitride diode is relatively expensive compared to a conventional silicon diode, and through experiments, it has been found that the power loss caused by the reverse recovery effect of the diode mainly occurs at the first voltage step of the voltage multiplier. Thus, in some embodiments, a silicon carbide diode or a gallium nitride diode is employed only in the first voltage step of the voltage multiplier 100, while a silicon diode is employed in other voltage steps. This can greatly reduce power loss and effectively control the cost of the power converter.

For example, in the embodiment shown in FIG. 1, each of the diodes (D2 or D4) in the first voltage step 121 comprises at least one of a silicon carbide diode and a gallium nitride diode; each diode (D6 or D8) in the second voltage step 122 comprises a silicon diode.

Figure 2:
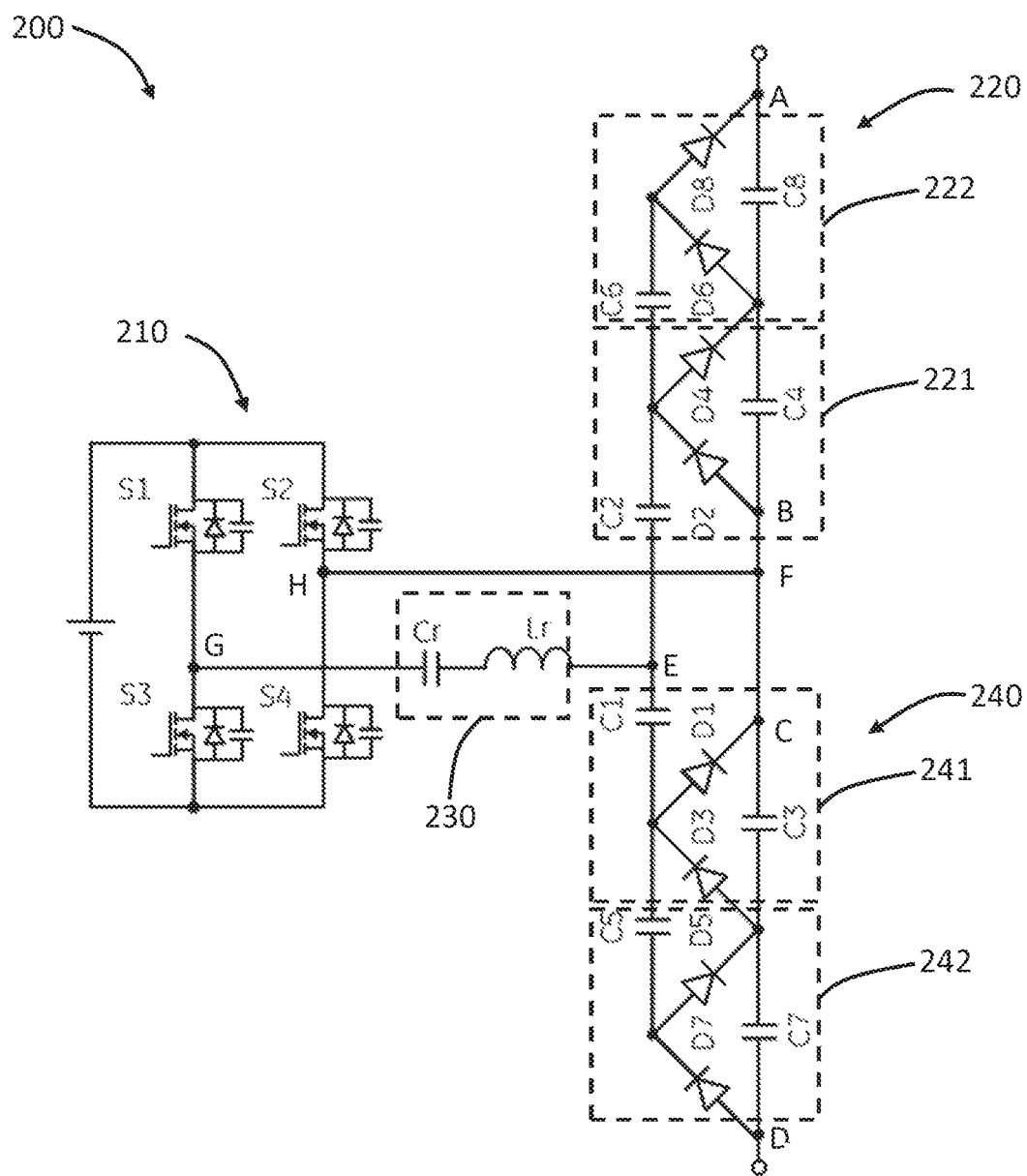
FIG. 2 is a schematic diagram of a power converter according to another embodiment of the present invention.

FIG. 2 is a schematic diagram of a power converter 200 according to another embodiment of the present invention. Referring to FIG. 2, the power converter 200 comprises an inverter 210, a resonant circuit 230, a first voltage multiplier 220, and a second voltage multiplier 240.

The structure and function of the inverter 210 and the resonant circuit 230 are similar to those of the inverter 110 and the resonant circuit 130 shown in the embodiment of FIG. 1, and are not described again herein.

The first voltage multiplier 220 is configured with input terminals E, and output terminals A, B. Input terminals E, F of the first voltage multiplier 220 are coupled to the output terminals of the resonant circuit 230 and are configured for receiving a first AC voltage that is processed by the resonant circuit 230. The first voltage multiplier 220 is configured to convert the received first AC voltage into a second DC voltage, and transmit the output from the output terminals A and B, wherein the voltage value of the second DC voltage is greater than a peak value of the first AC voltage.

Similar to the first voltage multiplier 120 shown in FIG. 1, the first voltage multiplier 220 comprises a first voltage step 221 and a second voltage step 222, wherein the first voltage step 221 is closer to the first input terminals E, F of the first voltage multiplier 120. Each voltage step comprises two diodes and two capacitors, which are connected in a manner similar to the first and second diodes as well as the first and second capacitors of the first voltage multiplier 120, and are not described again herein. Wherein each of the diodes (D2 or D4) in the first voltage step 221 comprises at least one of a silicon carbide diode and a gallium nitride diode. In some embodiments, each of the diodes (D6 or D8) in the second voltage step 222 comprises a silicon diode.

The second voltage multiplier 240 is configured with input terminals E, F and output terminals C, D. Input terminals E, F of the second voltage multiplier 240 are coupled to the output terminals of the resonant circuit 230 and are configured for receiving a first AC voltage that is processed by the resonant circuit 230. The second voltage multiplier 240 is configured to convert the received first AC voltage into a third DC voltage, and transmit the output from the output terminals C and D, wherein the voltage value of the third DC voltage is greater than a peak value of the first AC voltage.

Similar to the first voltage multiplier 221, the second voltage multiplier 240 comprises a first voltage step 241 and a second voltage step 242, wherein the first voltage step 241 is closer to the input terminals E, F of the second voltage multiplier 240. Each voltage step comprises two diodes and two capacitors, which are connected in a manner similar to the first and second diodes and the first and second capacitors in the first voltage multiplier 120 shown in FIG. 1, and are not described again herein. Wherein each of the two diodes (D1 or D3) in the first voltage step 241 comprises at least one of a silicon carbide diode and a gallium nitride diode. In some embodiments, each of the diodes (D5 or D7) in the second voltage step 242 comprises a silicon diode.

In the embodiment shown in FIG. 2, the output terminals A, B of the first voltage multiplier are coupled in series with the output terminals C, D of the second voltage multiplier, that is, the node B and the node C are connected to each other, such that a greater fourth DC voltage can be obtained at node AD, the fourth DC voltage being equal to the sum of the second. DC voltage and the third DC voltage.

Figure 3:
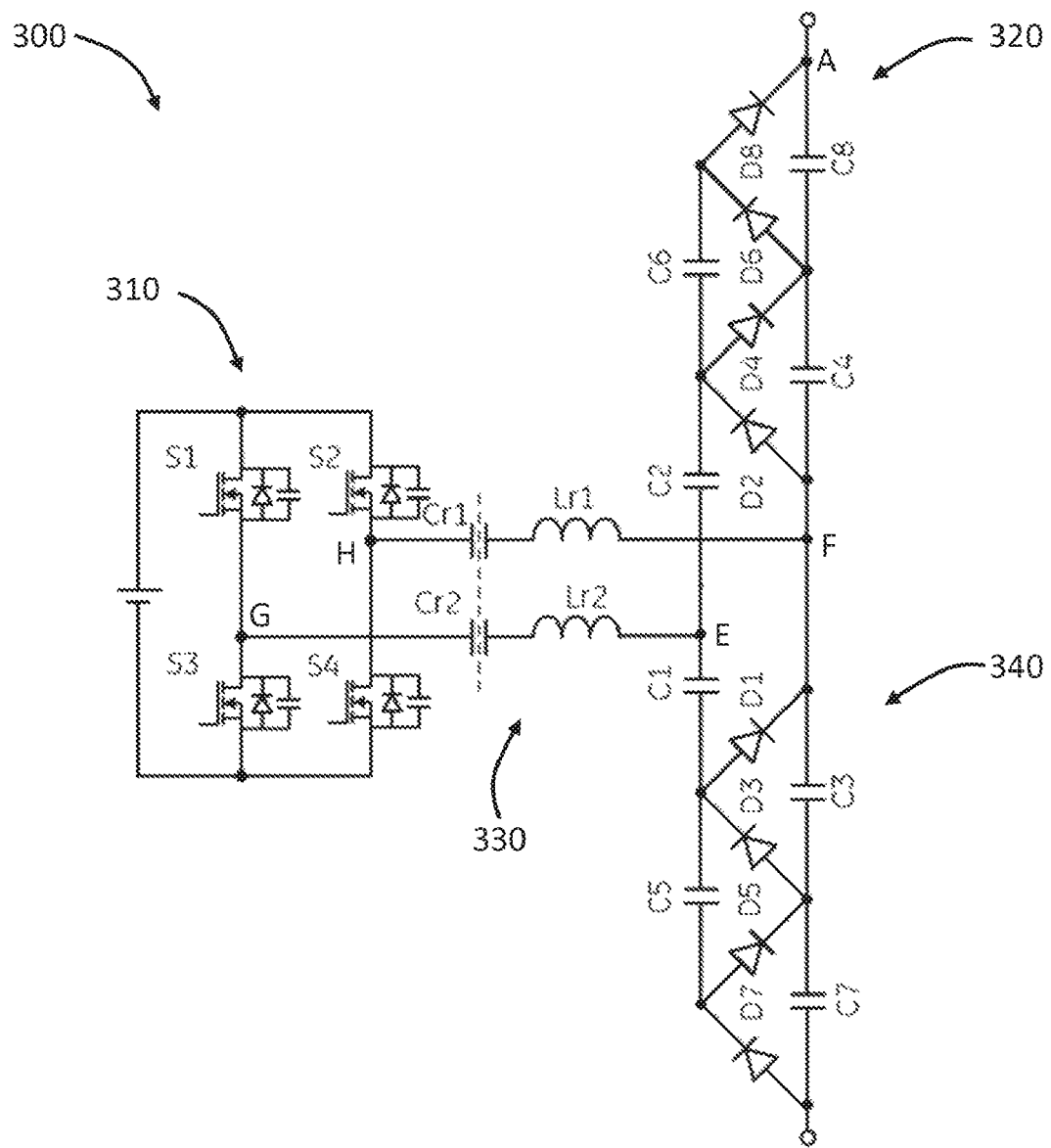
FIG. 3 is a schematic diagram of a power converter according to another embodiment of the present invention.

FIG. 3 is a schematic diagram of a power converter 300 according to another embodiment of the present invention. Referring to FIG. 3, the power converter 300 comprises an inverter 310, a resonant circuit 330, a first voltage multiplier 320, and a second voltage multiplier 340. The resonant circuit 330 is coupled to the output terminal of the inverter 310; the input terminals E and F of the first and second voltage multipliers are coupled together at the output terminal of the inverter 330; the output terminals of the first and second voltage multipliers are connected in series with each other.

The structure and function of the inverter 310, the first voltage multiplier 320 and the second voltage multiplier 340 are similar to those of the inverter 210, the first voltage multiplier 220 and the second voltage multiplier 240 respectively shown in FIG. 2, and are not described again herein.

A resonant circuit 330 is coupled between the inverter 310 and the input terminals E, F of the first and second voltage multipliers 320, 340, configured for frequency selective processing of the first AC voltage from the inverter 310, and the processed first AC voltage is output to the first and second voltage multipliers 320, 340. The resonant circuit 330 comprises a first resonating unit and a second resonating unit. The first resonating unit comprises a first resonant capacitor Cr1 and a first resonant inductor Lr1 connected in series with each other, which are coupled between the first output terminal H of the inverter 310 and the first input terminal F of the voltage multiplier. The second resonating unit comprises a second resonant capacitor Cr2 and a second resonant inductor Lr2 connected in series with each other, which are coupled between the second Output terminal G Of the inverter 310 and the second input terminal E of the voltage multiplier. Compared to the resonant circuit comprising only one resonating unit, e.g., the resonant circuit 230 in FIG. 2, the resonant circuit 330 comprises two resonant capacitors having a more symmetrical circuit structure, which can further reduce heat generation of the resonant capacitor and the resonant inductor, further improving the ability to suppress electromagnetic interference.

Figure 4:
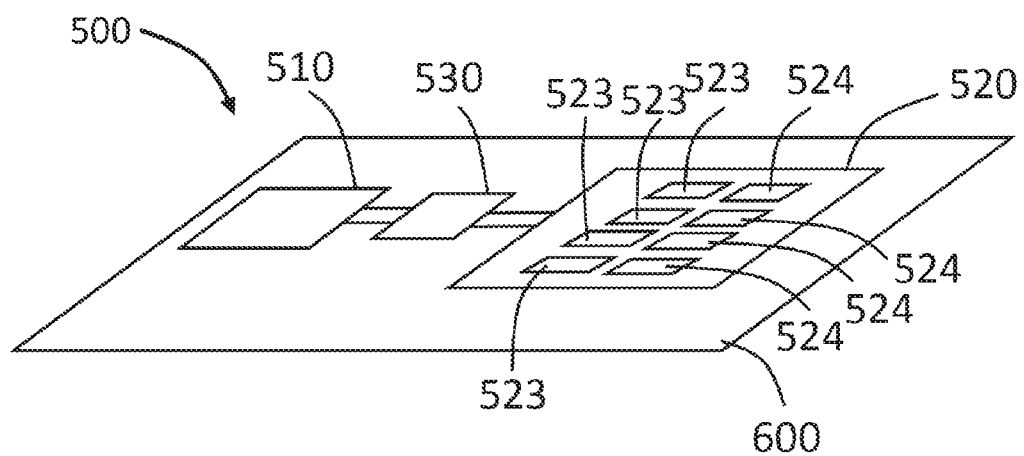
FIG. 4 is a schematic diagram of a power converter according to another embodiment of the present invention.

FIG. 4 is a schematic diagram of a power converter 500 disposed on a substrate 600 according to an embodiment of the present invention. Referring to FIG. 4, the power converter 500 comprises an inverter 510, a resonant circuit 530, and a voltage multiplier 520. The inverter 510, the resonant circuit 530, and the voltage multiplier 520 are all disposed on the substrate to constitute a printed circuit board.

At least a portion of the inverter 510 and the resonant circuit 530, e.g., a trace for connecting electrical components, is printed on the substrate 600. In some embodiments, the components in the inverter 510 and the resonant circuit 530 are surface-mount components that are mounted on the surface of the substrate 600.

At least a portion of the first voltage multiplier 520, such as a trace for connecting electrical components, is printed on the substrate 600. The first voltage multiplier 520 comprises a plurality of diodes 523 and a plurality of capacitors 524. Each of the diodes and capacitors is a surface-mount component, that is, has a flat shape and is mounted on the surface of the substrate 600. This can greatly reduce the size and weight of the power converter to further increase power density. In some embodiments, each of the diodes of the first voltage step is a surface-mounted silicon carbide diode or a surface-mount gallium nitride diode.

Embodiments of the present invention also relate to a power converting method that can be used to convert a lower DC voltage to a higher DC voltage.

Figure 5:
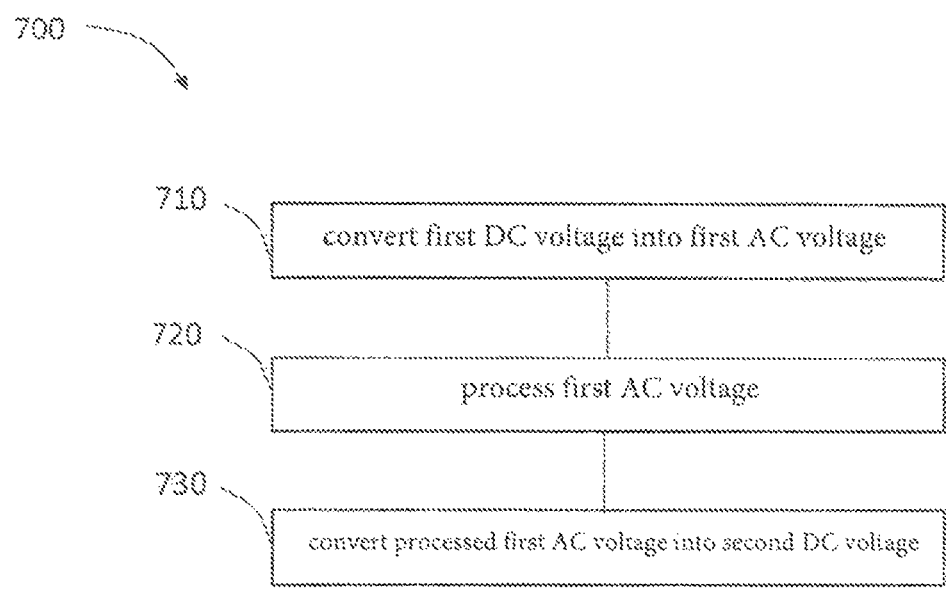
FIG. 5 is a schematic flow chart of a power converting method according to an embodiment of the present invention.

FIG. 5 is a flow chart of a power converting method 700 according to an embodiment of the present invention. Referring to FIG. 5, method 700 comprises steps 710 through 730.

In step 710, the first DC voltage is converted to a first AC voltage by the inverter.

In step 720, the first AC voltage is frequency-selected by the resonant circuit to output the processed first AC voltage.

In step 730, the first AC voltage processed by the resonant circuit is converted into a second DC voltage by a first voltage multiplier, and the voltage value of the second DC voltage is higher than a peak value of the first AC voltage. Wherein the first voltage multiplier comprises a plurality of stages, the first voltage step is closer to the input of the first voltage multiplier than the other voltage steps in terms of energy transmission, each voltage multiplier comprises at least two diodes, while each diode in a first stage of the plurality of stages comprises at least one of a silicon carbide diode and a gallium nitride diode.

While the present invention has been described in detail with reference to specific embodiments thereof, it will be understood by those skilled in the art that many modifications and variations can be made in the present invention. It is, therefore, to be understood that the appended claims are intended to cover all such modifications and variations insofar as they are within the true spirit and scope of the invention.

The invention claimed is:

1. A power converter, comprising:
an inverter configured to convert a first DC voltage into a first AC voltage, the inverter comprising two legs, each leg comprising a first switching device and a second switching device coupled in series, a first output terminal coupled between the first and second switching devices of the first leg, and a second output terminal coupled between the first and second switching devices of the second leg;
a resonant circuit coupled to the inverter, the resonant circuit configured to process the first AC voltage into a second, filtered AC voltage, the resonant circuit comprising a first resonating unit and a second resonating unit, the first resonant unit coupled between the first output terminal of the inverter and a first output terminal of the resonant circuit, the second resonant unit coupled between the second output terminal of the inverter and a second output terminal of the resonant circuit; and
a voltage multiplier coupled to the resonant circuit without a transformer between the inverter and the voltage multiplier, the voltage multiplier configured to convert the second, filtered AC voltage into a second DC voltage, the voltage multiplier comprising a plurality of stages, each stage comprising two diodes;

the first resonating unit coupled between the first output terminal of the inverter and a first input terminal of the voltage multiplier via a first path;

the second resonating unit coupled between the second output terminal of the inverter and a second input terminal of the voltage multiplier via a return path.

2. The power converter according to claim 1, wherein:

each diode in a first stage of the plurality of stages is at least one of a silicon carbide diode and a gallium nitride diode; and each diode in a second stage of the plurality of stages is a silicon diode.

3. The power converter according to claim 1, wherein:

at least a part of the voltage multiplier is printed on a substrate; and each diode in the voltage multiplier has a flat shape and is mounted on a surface of the substrate.

4. The power converter according to claim 1, wherein each stage further comprises two capacitors.

5. The power converter according to claim 4, wherein:

at least a part of the voltage multiplier is printed on a substrate; and each of the capacitors has a flat shape and is mounted on a surface of the substrate.

6. The power converter according to claim 1, wherein the first resonating unit comprises a capacitor and an inductor coupled in series.

7. The power converter according to claim 1, wherein the second resonating unit comprises a capacitor and an inductor coupled in series.

8. A method for operating a power converter, the power converter including an inverter and resonant circuit coupled to a voltage multiplier without a transformer between the inverter and the voltage multiplier, the resonant circuit having a first resonating unit and a second resonating unit, the first resonating unit coupled to the voltage multiplier via a first path, the second resonating unit coupled to the voltage multiplier via a return path, the voltage multiplier having a plurality of stages, each stage having two diodes, the method comprising:

converting a first DC voltage into a first AC voltage via the inverter;

processing the first AC voltage into a second, filtered AC voltage via the resonant circuit; and converting the second, filtered AC voltage into a second DC voltage via the voltage multiplier.

9. The power converter according to claim 1, wherein the second DC voltage is higher than a peak value of the first AC voltage.

10. The method according to claim 8, wherein the second DC voltage is higher than a peak value of the first AC voltage.

11. The method according to claim 8, wherein:

each diode in a first stage of the plurality of stages is at least one of a silicon carbide diode and a gallium nitride diode; and each diode in a second stage of the plurality of stages is a silicon diode.

12. The method according to claim 8, wherein each stage further comprises two capacitors.

13. The method according to claim 8, wherein the first resonating unit comprises a capacitor and an inductor coupled in series.

14. The method according to claim 8, wherein the second resonating unit comprises a capacitor and an inductor coupled in series.

15. A power converter, comprising:

an inverter configured to convert a first DC voltage into a first AC voltage, the inverter comprising two legs, each leg comprising a first switching device and a second switching device coupled in series, a first output terminal coupled between the first and second switching devices of the first leg, and a second output terminal coupled between the first and second switching devices of the second leg;

a resonant circuit coupled to the inverter, the resonant circuit configured to process the first AC voltage into a second, filtered AC voltage, the resonant circuit comprising a first resonating unit and a second resonating unit, the first resonant unit coupled between the first output terminal of the inverter and a first output terminal of the resonant circuit, the second resonant unit coupled between the second output terminal of the inverter and a second output terminal of the resonant circuit;

a first voltage multiplier coupled to the first resonating unit without a transformer between the inverter and the first voltage multiplier, the first voltage multiplier configured to convert the second, filtered AC voltage into a second DC voltage, the first voltage multiplier comprising a first plurality of stages, each stage of the first plurality of stages comprising two diodes; and a second voltage multiplier coupled to the second resonating unit without a transformer between the inverter and the second voltage multiplier, the second voltage multiplier configured to convert the second, filtered AC voltage into a third DC voltage, the second voltage multiplier comprising a second plurality of stages, each stage of the second plurality of stages comprising two diodes;

the first resonating unit coupled between the first output terminal of the inverter and the first input terminals of the first and second voltage multipliers via a first path;

the second resonating unit coupled between the second output terminal of the inverter and the second input terminals of the first and second voltage multipliers via a return path.

16. The power converter according to claim 15, wherein:

the second DC voltage is higher than a peak value of the first AC voltage; and the third DC voltage is higher than the peak value of the first AC voltage.

17. The power converter according to claim 15, wherein:

each diode in a first stage of the first and second plurality of stages is at least one of a silicon carbide diode and a gallium nitride diode; and each diode in a second stage of the first and second plurality of stages is a silicon diode.

18. The power converter according to claim 15, wherein an output terminal of the first voltage multiplier is coupled in series with an output terminal of the second voltage multiplier.

19. The power converter according to claim 15, wherein the first resonating unit comprises a capacitor and an inductor coupled in series.

20. The power converter according to claim 15, wherein the second resonating unit comprises a capacitor and an inductor coupled in series.

* * * * *